Patented June 17, 1952

2,600,764

UNITED STATES PATENT OFFICE 2,600,764

HYDROGENATED PRODUCTS

Mortimer T. Harvey, South Orange, N. J., assignor to Harvel Research Corporation, a corporation of New Jersey No Drawing. Application February 29, 1952,
Serial No. 274,080

6 Claims. (Cl. 260—64)

This invention relates to novel compositions of matter and to novel methods as well as to steps in said methods for producing them. More particularly this invention is directed to novel products and to methods and steps in the methods for producing them with reaction products under alkaline conditions of furfuraldehyde and a ketone and fractions thereof, as starting materials. The class of ketones which are employed to provide said starting materials are those having two hydrogen atoms on an alpha carbon, such as acetone, diacetone alcohol, methyl ethyl ketone, acetonyl acetone, cyclohexanone, etc.

The starting materials may be prepared by reacting under alkaline conditions furfuraldehyde with one or a combination of two or more of said ketones. For this purpose the furfuraldehyde and ketone are mixed with each other and then thereto is added a quantity of an alkaline material such as an aqueous solution of sodium hydroxide, potassium hydroxide, lime or the like. These three components are mixed with each other in an autoclave or closed unit and shortly after the mixture takes place, an exothermic reaction occurs and the pressure within the autoclave will rise. This vigorous reaction is not easily controlled by ordinary methods, such as by using reacting units which have air vents through the top, because under such conditions many times there may be losses of some of the reaction products escaping through the air vents. For this reason an autoclave is recommended as the reacting unit. After the exothermic reaction has subsided the reaction is practically complete. In order to assure complete reaction and high yields, the mass in the autoclave is externally heated to maintain it in the state of boiling for a period of time depending upon the viscosity desired of the resultant reaction mass, which may vary from a thin liquid to a solid at room temperature. Generally, I prefer that the time of boiling is such that the viscosity of the reaction mass employed as a starting material when dehydrated is a liquid, that is, it is pourable at 25° C. and for some purposes at the present time no greater than approximately 20,000 cp. at 25° C. and in all cases no lower than 50 cp. at 25° C. This reaction provides compounds which are mono and di-furfuryl ketones, having the following formulae:

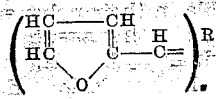

in which $x$ is a whole number selected from the group of 1 and 2, and R is a ketone lacking two of the hydrogen atoms normally on either one or both of its alpha carbons. These compounds are produced as a result of reaction between the furfuraldehyde and ketone wherein two hydrogens on the alpha carbons unite with the oxygen of the furfuraldehyde to split off water. This reaction also provides an amorphous or resinous material. The quantity of said resinous material present in the reaction mass varies and is dependent upon the time magnitude of boiling of the reaction mass and is approximately 5% or more of the reaction mass by weight and in general measures about 5%–60% by weight of the reaction mass. Because of the heat polymerization characteristic of said compounds, the percentage of resin in the resultant reaction mass is measured after the mass is hydrogenated as hereinafter set forth.

Said resultant reaction mass as well as residual fractions thereof may be used as starting materials. Said residual fractions are produced by heat distillation of said reaction mass either at atmospheric or subatmospheric pressure and continued until a distillate is removed, measures by weight from 0–40% of the weight of said reaction mass and consists essentially of mono and/or difurfuryl ketone, leaving behind said residual fractions measuring not less than 60% by weight of said reaction mass. Said fractions contain at least 5% resin by weight.

Reference is hereby made to the U. S. Patent No. 2,363,828 which issued to S. Caplan and me on November 28, 1944, and particularly to those examples therein disclosing compositions produced by reacting under alkaline conditions furfuraldehyde and a ketone having two hydrogen atoms on an alpha carbon and all these compositions as well as fractions thereof produced as above set forth also may be used as starting materials herein.

In the following general example said resultant reaction mass will be treated, but any of the other aforesaid compositions as well as their various fractions above identified may be used in place thereof.

GENERAL EXAMPLE

Said resultant reaction mass may then be rendered substantially neutral in any convenient manner. This may be easily accomplished by adding thereto the requisite amount of an aqueous solution of an acidic agent, such as hydrochloric acid, sulphuric acid, lactic acid or the like. Generally it is preferable that the amount of acidic agent be such as to lower the pH of the mass to a value in the range of 3-7.4 and generally in the range of 3-6.

Following this step, the mass is substantially completely dehydrated. One method for doing this is to heat preferably under a high vacuum, until all of the water and any unreacted components have been substantially completely distilled off.

This completely dehydrated reaction product may then be hydrogenated only partially by employing a nickel catalyst, maintaining the temperature thereof at a value of at least 120° C. and preferably in the range of 120° C.-250° C. and the pressure thereof at a value of at least 25 lbs. per square inch and between 25-250 lbs. per square inch, but preferably in the range of 30-75 lbs. per square inch. The nickel employed may be in a finely divided state and may be coupled with any suitable carrier such as a hydrogenated vegetable oil, hydrogenated cardanol, etc.

Briefly, the hydrogenation may be accomplished by adding the requisite amount of nickel catalyst in the carrier to said dehydrated approximately neutral reaction product and the mixture is heated while vacuum is applied and agitated until a uniform mixture has been obtained. When the temperature of the mix reaches 120°, the external source of heat is removed, hydrogen gas is admitted thereto to provide a pressure of 25-250 lbs. per square inch whereupon hydrogenation takes place and is an exothermic reaction. The addition of the hydrogen is continued whereupon the temperature of the mass rises and is maintained at a level no greater than 250° C. and the pressure is maintained at a value no greater than 250 lbs. per square inch and generally between 30-75 lbs. per square inch. The hydrogen is continuously added under the aforesaid conditions until the amount of added hydrogen is approximately 70-340 cubic feet measured at 20° C. and 760 mm. pressure. The hydrogen added and combined is approximately 15%-65% of the quantity of hydrogen necessary for complete saturation of all the carbon to carbon double bonds thereof. The hydrogenation is discontinued after the desired degree of hydrogenation has been attained. Then the hydrogenated mass is allowed to cool to room temperature. By this procedure the reaction mass after hydrogenation is still unsaturated. The carbon to carbon double bonds of the compounds in said mass and outside of the furane ring have been at least 50% saturated with hydrogen, and may be 50%-100% saturated with hydrogen, with 0%-50% saturation with hydrogen of the carbon to carbon double bonds in the furane ring. The amount of said neutral reaction product employed was 40 pounds.

When the mass to be hydrogenated is of a very high viscosity, for example, over 20,000 cp. at 25° C., I first dissolved the mass in a solvent, such as a high molecular weight ketone, and then hydrogenated under the aforesaid conditions.

The hydrogenated mass as well as the various fractions thereof produced in the manner hereintofore set forth as well as residual fractions of said hydrogenated mass produced by the heat distillation of said hydrogenated mass to provide fractions measuring 100-60% by weight of the hydrogenated mass may all be used for a wide variety of purposes in a number of different fields. Some of the uses are as follows:

1. They may be used either alone or in combination with other materials to provide coating and printing compositions finding many different applications, as for example in the fields of paints, varnishes, lacquers, electrical insulating coatings, rust-proofing, etc. The hydrogenated mass as well as the various hydrogenated residual fractions dry upon exposure to air when in film-form, either alone or in combination with a drying oil, such as linseed oil, China-wood oil or the like or with other oils such as perilla oil, rape seed oil, cottonseed oil, soyabean oil, fish oils or other similar oils of animal, vegetable or marine origin which may be dried upon exposure to air in film-form and in combination with the common driers such as manganese resinate, copper oleate or Soligen driers. In these combinations with these various oils, the ratio of the quantity by weight of the hydrogenated mass or the various hydrogenated residual fractions thereof to the oil may vary in the range of 1-10 to 10-1 depending upon the particular product desired and the particular oil employed as well as upon the presence or absence of other components, such as the driers, for example.

2. They may be used as plasticizers for the various normally solid polymers and copolymers of the vinyl esters and the solid polymers of the vinyl acetals and various cellulose derivatives. Examples of these polymers and copolymers are polyvinyl chloride, polyvinyl acetate, copolymers of vinyl chloride and vinyl acetate, polyvinyl butyral, polyvinyl formal and polyvinyl acetal; and examples of the cellulose derivatives are cellulose nitrate, cellulose acetate, benzyl cellulose, alkyl ethers of cellulose, such as methyl cellulose, ethyl cellulose, etc. They may be used as plasticizers for various other materials, among which are natural rubber, reclaimed rubber, rubbery polymers of chloroprene, rubbery copolymers of butadiene and styrene and rubbery copolymers of butadiene and acrylonitrile. As plasticizers, I prefer to use the hydrogenated mass or the various hydrogenated residual fractions which also find particular application in the production of gels which may be produced by first heating therewith until solution takes place one or more of said polymers and copolymers and cellulose derivatives. These solutions on cooling are gels. The stiffness or rigidity of the various gels depends upon the ratio of quantity of the hydrogenated mass or the particular hydrogenated fraction to the quantity of the polymer, copolymer or cellulose derivative employed and also upon the particular components used. These highly useful gels may be employed either alone or in combination with other materials. For example, they may, by milling, be compounded with the various rubber and rubbery polymers and copolymers herein mentioned.

3. They may be reacted with a reactive methylene group containing agent to provide novel resinous condensation reaction products. The reaction is carried out in the presence of a condensing agent. Examples of the reactive methylene group containing agents are formaldehyde, paraformaldehyde, glyoxal, acrolein, aldol, hexamethylene tetramine, etc. as well as any of them that are available in their polymeric form. Examples of the condensing agents are sodium hydroxide, potassium hydroxide, sulphuric acid, phosphoric acid, hydrochloric acid, zinc chloride, diethyl sulphate, etc. Generally, these novel condensation reaction products may be produced by mixing 150 parts by weight of the hydrogenated mass or one of the hydrogenated fractions with 25-100 parts by weight of one of said reactive methylene containing agents and 1%-5% by weight of a condensing agent. This mixture is heated to an elevated temperature, preferably to boiling, and is maintained at said temperature until a resinous condensation product of the desired viscosity is obtained. Then the mass is dehydrated and the resin is ready for use either with or without solvents and/or other materials. All of the various resins may be employed in floor coverings, table tops and other coating media because of their acid and alkali resistance characteristics; they may be employed as plasticizers for phenol-aldehyde resins, alkyd resins, etc. and such combinations may be used in the laminating field for the lamination of paper, wood, cork, metal, glass, etc.

When the reaction is carried out under acidic conditions, there may be produced thermosetting resins, which are in the intermediate state and in this state vary in consistency from readily pourable liquids, to heavy viscous molasses-like masses to brittle solids, all of which may be heat converted to the dry solid and infusible state under either acidic or alkaline conditions.

All of the partially hydrogenated products of this invention are characterized by being capable of being converted to the substantially solid and infusible state when a mixture thereof and an acidic agent in amount sufficient to impart a pH of 2.5 to said mixture is maintained at 300° F. for a period of 24 hours.

The method which I have employed for ascertaining the pH of the various materials herein is that commonly used in the art for materials free of water or being water insoluble and is as follows: About a 10-20 cc. sample of the material whose pH is to be ascertained is placed in a test tube containing an equal volume of distilled water. The mixture is heated to boiling while being shaken and then allowed to stand and come to room temperature. Then this aqueous mass is tested with pH test paper commonly employed in the art.

The following examples are given merely to further illustrate the methods for providing some of the starting materials and are not to be construed in a limiting sense, all parts given being by weight unless otherwise indicated.

*Example 1*

Into a one-gallon pail is placed a quantity of sodium hydroxide weighing 2 lbs. 6 oz. Then there is added thereto sufficient water to fill the pail and the sodium hydroxide in the water is stirred until the sodium hydroxide is completely dissolved therein. Then in a Monel metal lined autoclave are placed 40 lbs. of furfuraldehyde and 24 lbs. of acetone. This autoclave is preferably provided with a mechanical agitator or stirrer which may be in the nature of a paddle mixer. This mixture is agitated and while in the state of agitation there is added thereto about ⅛ of the volume of said heretofore prepared aqueous solution of sodium hydroxide. With all the valves of the autoclave closed it will be noted that an exothermic reaction takes place in a very few minutes after the addition of the sodium hydroxide solution and the temperature of the mass continuously agitated by the stirrer will rise to approximately 150° F. in about three or four minutes. After about 10 minutes there is added to the mass in said autoclave another charge consisting of 40 lbs. of furfuraldehyde and 24 lbs. of acetone. Then to the mass in the autoclave there is added a second increment of said sodium hydroxide solution equal in volume to the first addition. After a few minutes the temperature of the mass will, due to the exothermic reaction, rise to approximately 165° F.–170° F. The foregoing steps are repeated four more times so that the amount of furfuraldehyde and acetone added to the autoclave are equal to 240 lbs. and 144 lbs. respectively and all of the initially prepared aqueous solution of sodium hydroxide has been added. After the last addition of sodium hydroxide the temperature of the mass within the autoclave will have stabilized to about 180–195° F. Then the mass within the autoclave may be heated by means of a steam coil located therein and through a jacket carried thereby to maintain the temperature of the mass between approximately 185–190° F. for about 30 minutes in order to complete the reaction and to obtain high yields. The steam is cut off from the coil and jacket and then there is added thereto an aqueous solution of sulphuric acid in quantities sufficient to render the mass practically neutral. In this instance there may be added an aqueous solution of sulphuric acid consisting of 3 lbs. 3 oz. of concentrated sulphuric acid diluted in 6 lbs. 6 oz. of water. Then this mass may be heated for about 5 minutes at a temperature between 175–200° F. to substantially completely neutralize the mass. The substantially neutral mass may then be substantially completely dehydrated by heating the same to a temperature of 220° F. with or without vacuum yielding approximately 300 lbs. of dehydrated substantially neutral material known as Product A, whose viscosity at 25° C. is 92 cp. and having a specific gravity at 25° C. of 1.150. When this material, Product A, is distilled at a pressure of approximately .1 mm. of mercury pressure a fraction (37%) weighing approximately 110 lbs. comes off at temperatures in the range of 70–85° C. and is apparently essentially monofurfuryl acetone leaving behind a residual fraction known as Product RFA.

*Example 1A*

40 lbs. of Product A is placed in a 10-gallon closed unit equipped with a high speed propeller. Then one lb. of a catalyst and carrier combination containing 25% of catalytic nickel dispersed in a hydrogenated vegetable oil is added thereto and the mixture is continuously stirred in order to maintain a uniform distribution of the components. While in this state of agitation, the mass is externally heated to a temperature of 120° C. after substantially all the air in the container has been evacuated therefrom. Then hydrogen is admitted to provide a pressure of 40 lbs. per square inch. Hydrogen is continuously admitted to the mass and hydrogenation takes place exothermically and now the external source of heat is removed therefrom. By controlling the speed of addition of the hydrogen to the mass, the temperature is maintained at approximately 200° C. and the pressure of approximately 50 lbs. per square inch. The temperature during hydrogenation may also be controlled by external cooling. The hydrogen addition is terminated when no more hydrogen is taken up under these conditions with a period of about 30 minutes. The quantity of hydrogen taken up in this particular hydrogenation step apparently due to early poisoning of the catalyst amounted to approximately 145 cubic feet which corresponds roughly to the quantity of hydrogen required to saturate only the unsaturated carbon to carbon atoms outside the furane ring. Another quarter pound fresh catalyst may be added if desired and hydrogenation continued until 180, 200, 250, 300 or 340 cu. ft. hydrogen are combined.

This hydrogenated Product A, hereinafter known as HA is still a thin liquid and may be distilled if desired to provide various residual fractions thereof.

*Example 2*

By using the same procedure as that set forth in Example 1, and substituting 180 lbs. of methyl ethyl ketone for the 144 lbs. of acetone, and terminating hydrogen addition when approximately 150 cu. ft. of hydrogen have been taken up, there may be produced a novel hydrogenated product. This hydrogenated product known as Product HB may be distilled to provide various residual fractions.

*Example 3*

By using the same procedure as that set forth in Example 2, and substituting 240 lbs. of diacetone alcohol for the 180 lbs. of methyl ethyl ketone, there may be produced a novel hydrogenated product known as HC. This hydrogenated product HC may be distilled to provide various residual fractions.

All of the partially hydrogenated products of this invention may be converted to the solid infusible state by the use of heat together with an acidic agent such as hereinbefore set forth.

When 100 grams of Product HA and 20 cc. of diethyl sulfate were mixed in a beaker and allowed to stand at room temperature for 3 weeks. At the end of that period, the viscosity of the mass at 25° C. was more than 10 times that of Product HA at 25° C. A sample of the mass was then placed in an oven at 300° F. and was found to be a very tough, infusible resin after 16 hours.

The various hydrogenated products of this invention were mixed with 20% diethyl sulphate and solvent when required and these mixtures were employed as impregnants and coatings on bases. The so-treated bases were placed in an oven at 300° F. and after 16 hours the component had been converted to the infusible, tough, chemically resistant mass.

It is also to be understood that the following claims are intended to cover all the generic and specific features of the invention herein described and all statements of the scope of the invention, which as a matter of language might be said to fall therebetween; and that they are intended to be inclusive in scope and not exclusive, in that, if desired, other materials may be added to my novel compositions of matter herein claimed without departing from the spirit of the invention. Particularly it is to be understood that in said claims, ingredients or components recited in the singular are intended to include compatible mixtures of said ingredients wherever the sense permits.

This application is a continuation-in-part of my copending application Serial No. 732,124, filed March 3, 1947, and Serial No. 144,594, filed February 16, 1950.

Having thus described the invention, what I claim is:

1. A partially hydrogenated product selected from the group consisting of (a) partially hydrogenated reaction masses, said reaction masses, before hydrogenation having a viscosity of at least 50 centipoises at 25° C. and having a resinous content of at least 5% by weight and produced by reacting under alkaline conditions furfuraldehyde and a ketone having two hydrogen atoms on an alpha carbon and (b) partially hydrogenated residues, said residues before hydrogenation having a resinous content of at least 5% by weight and being the residues produced by heat distilling said masses until the quantity by weight of said residues measures not less than 60% of the weight of said masses, said partially hydrogenated product saturated with hydrogen to the extent of no less than approximately 15% and no more than approximately 65% the normally present carbon to carbon double bonds in said product before hydrogenation, said hydrogenated product characterized by being capable of being converted to the substantially solid and infusible state when a mixture thereof and an acidic agent in amount sufficient to impart a pH of 2.5 to said mixture is maintained at 300° F. for a period of 24 hours.

2. A product defined in claim 1, the ketone being acetone.

3. A product defined in claim 1, the ketone being mesityl oxide.

4. A product defined in claim 1, the ketone being diacetone alcohol.

5. A product defined in claim 1, the ketone being methyl ethyl ketone.

6. A product defined in claim 1, the ketone being acetonyl acetone.

MORTIMER T. HARVEY.

No references cited.